US008793267B2

(12) United States Patent
Krishnaprasad et al.

(10) Patent No.: US 8,793,267 B2
(45) Date of Patent: *Jul. 29, 2014

(54) OPTIMIZATION OF QUERIES ON A REPOSITORY BASED ON CONSTRAINTS ON HOW THE DATA IS STORED IN THE REPOSITORY

(75) Inventors: Muralidhar Krishnaprasad, Fremont, CA (US); Zhen Hua Liu, San Mateo, CA (US); Vikas Arora, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,977

(22) Filed: Apr. 24, 2012

(65) Prior Publication Data

US 2012/0271814 A1    Oct. 25, 2012

Related U.S. Application Data

(63) Continuation of application No. 11/243,345, filed on Oct. 3, 2005, now Pat. No. 8,166,059.

(60) Provisional application No. 60/697,866, filed on Jul. 8, 2005.

(51) Int. Cl.
G06F 7/00 (2006.01)
G06F 17/30 (2006.01)

(52) U.S. Cl.
USPC .......................... 707/759; 707/713; 707/769

(58) Field of Classification Search
None
See application file for complete search history.

(56) References Cited

U.S. PATENT DOCUMENTS

| 5,717,911 | A | 2/1998 | Madrid et al. |
| 6,038,214 | A | 3/2000 | Shionozaki |
| 6,253,195 | B1 | 6/2001 | Hudis et al. |
| 6,282,537 | B1 | 8/2001 | Madnick et al. |
| 6,356,887 | B1 | 3/2002 | Berenson et al. |
| 6,356,889 | B1 | 3/2002 | Lohman et al. |
| 6,536,889 | B1 | 3/2003 | Biegelsen et al. |

(Continued)

FOREIGN PATENT DOCUMENTS

JP    2002-150000    5/2002

OTHER PUBLICATIONS

International Searching Authority, "Notification of Transmittal of the International Search Report and the Written Opinion of the International Searching Authority, or the Declaration," PCT/US2005/021259, dated Nov. 24, 2005, 13 pages.
Current Claims, PCT/US2005/021259, 15 pages.

(Continued)

*Primary Examiner* — Rehana Perveen
*Assistant Examiner* — Huen Wong
(74) *Attorney, Agent, or Firm* — Hickman Palermo Truong Becker Bingham Wong LLP

(57) ABSTRACT

Constraints that restrict how corresponding identifiable groups of files are stored in a database, are enforced on corresponding file data. In response to a query on any data from an identifiable group of files, the effect of the constraint on how the corresponding data is stored is determined. The original query is rewritten, based on the effect of the constraint, so that the rewritten query is directed to a particular subset of the data stored in the database. Consequently, the search space is restricted to an identifiable subset of the database and execution of the rewritten query is more efficient than execution of the original query.

36 Claims, 3 Drawing Sheets

(56) References Cited

U.S. PATENT DOCUMENTS

| | | | |
|---|---|---|---|
| 6,880,156 | B1 | 4/2005 | Landherr et al. |
| 7,013,311 | B2 | 3/2006 | Hui et al. |
| 7,031,956 | B1 | 4/2006 | Lee et al. |
| 7,096,224 | B2 * | 8/2006 | Murthy et al. ............ 707/763 |
| 7,099,858 | B2 | 8/2006 | Aldrich et al. |
| 7,167,848 | B2 | 1/2007 | Boukouvalas et al. |
| 7,359,922 | B2 | 4/2008 | Young-Lai et al. |
| 2001/0037345 | A1 | 11/2001 | Kiernan et al. |
| 2002/0007375 | A1 | 1/2002 | Ebata |
| 2002/0073019 | A1 | 6/2002 | Deaton |
| 2002/0100027 | A1 | 7/2002 | Binding et al. |
| 2002/0116457 | A1 | 8/2002 | Eshleman et al. |
| 2002/0133497 | A1 | 9/2002 | Draper et al. |
| 2003/0200214 | A1 | 10/2003 | Doole et al. |
| 2004/0015783 | A1 | 1/2004 | Lennon et al. |
| 2004/0064466 | A1 | 4/2004 | Manikutty et al. |
| 2004/0093344 | A1 | 5/2004 | Berger et al. |
| 2004/0143581 | A1 | 7/2004 | Bohannon et al. |
| 2004/0148278 | A1 | 7/2004 | Milo et al. |
| 2004/0167904 | A1 | 8/2004 | Wen et al. |
| 2004/0193575 | A1 | 9/2004 | Chen et al. |
| 2004/0243555 | A1 | 12/2004 | Bolsius et al. |
| 2004/0260691 | A1 | 12/2004 | Desai et al. |
| 2004/0267760 | A1 | 12/2004 | Brundage et al. |
| 2005/0004892 | A1 | 1/2005 | Brundage et al. |
| 2005/0022115 | A1 | 1/2005 | Baumgartner et al. |
| 2005/0120029 | A1 | 6/2005 | Tomic et al. |
| 2005/0160076 | A1 | 7/2005 | Kanemasa |
| 2005/0289125 | A1 | 12/2005 | Liu et al. |
| 2006/0101011 | A1 | 5/2006 | Lindsay et al. |

OTHER PUBLICATIONS

Choi, Byron et al., "The XQuey Formal Semantics: A Foundation for Implementation Optimization," May 31, 2002, IEEE XP-002353605, 15 pages.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, IEEE XP-002353604, pp. 1009-1018.

Shanmugasundaram, Jayavel, et al., "Querying XML Views of Relational Data," Proceedings of the $27^{th}$ Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Funderbunk, J. et al., "XML programming with SQL/XML and XQuery", IBM Systems Journal, XP-002295973 (2002), pp. 642-665.

Zhang, Xin et al., "Honey, I Shrunk the XQuery!—An XML Algebra Optimization Approach," Submission for WIDM'02, IEEE XP-002316448, 14 pages.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages.

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

International Preli Minary Examining Authority, "Written Opinion," PCT/US2005/021259, dated Oct. 13, 2006, 7 pages.

Current Claims, PCT/US2005/021259, 10 pages.

European Patent Office, "Communication Pursuant to Article 94(3) EPC", Application No. 05 760 442.3-2201, dated Jun. 20, 2008, 2 pages.

Claims, Application No. 05 760 442.3-2201, 8 pages.

* cited by examiner

OPTIMIZATION OF QUERIES ON A REPOSITORY BASED ON CONSTRAINTS ON HOW THE DATA IS STORED IN THE REPOSITORY

CROSS-REFERENCE TO RELATED APPLICATIONS

This application is a continuation of U.S. patent application Ser. No. 11/243,345, entitled "OPTIMIZATION OF QUERIES ON A REPOSITORY BASED ON CONSTRAINTS ON HOW THE DATA IS STORED IN THE REPOSITORY", filed on Oct. 3, 2005, now U.S. Pat. No. 8,166,059 which is related to and claims the benefit of priority to U.S. Provisional Patent Application No. 60/697,866 filed on Jul. 8, 2005, entitled "QUERY OPTIMIZATIONS BASED ON CONSTRAINTS ON HIERARCHICALLY ORGANIZED DATA AND ITS MANNER OF STORAGE IN A DATABASE"; the entire contents of which is incorporated by this reference for all purposes as if fully disclosed herein.

This application is related to U.S. patent application Ser. No. 10/428,878 filed on May 1, 2003, entitled "Techniques For Rewriting XML Queries Directed to Relational Database Constructs"; and is related to U.S. patent application Ser. No. 10/984,471 filed Nov. 8, 2004, entitled "Techniques For Partial Rewrite of XPATH Queries In A Relational Database"; and is related to U.S. patent application Ser. No. 10/948,523 filed Sep. 22, 2004, entitled "Efficient Evaluation of Queries Using Translation"; the entire contents of all of which are incorporated by this reference for all purposes as if fully disclosed herein. These three applications are referred to herein as the "Query Rewrite" references.

FIELD OF THE INVENTION

The present invention relates generally to data management and, more specifically, to optimizing queries on a database based on constraints that affect how data in a portion of a directory is stored in the database.

BACKGROUND

Data stored in relational and object-relational constructs can be optimized in a variety of ways that are well understood. Hierarchy-based storage mechanisms allow data to be stored as files and folders, where the data eventually resides in relational tables. Queries can be posed on the various folders and files to search on the metadata or the data stored in the files. However, since these queries are often across a variety of files and folders that are mapped to different relational tables, it is not readily possible to take advantage of the optimizations offered by the underlying relational storage for the data.

Logical hierarchical storage of data is becoming popular due in part, for example, to (a) search engine technologies, and (b) XML data storage. In such cases, the queries tend to be either XQuery (or JSR 170 type XPath query) or SQL queries on the hierarchical data. For example, XQuery uses doc( ) and collection( ) functions which can be mapped to the hierarchical storage.

Currently, relational database systems can optimize queries on relational and XML tables very efficiently, however, the same technology cannot be directly used if the queries are posed against the database in which data is hierarchically stored because the data stored in the database is heterogeneous. Because of the widespread use of hierarchical storage of data, there is room for improvement in achieving relational performance for queries over hierarchical storage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1A:
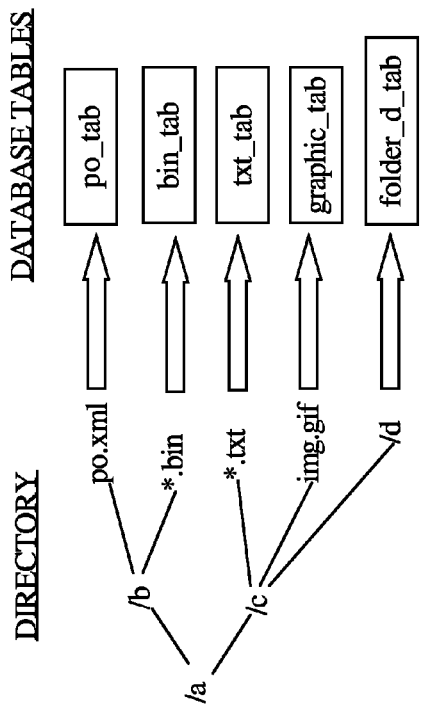
FIG. 1A and FIG. 1B are block diagrams that visually illustrate mapping portions of a directory structure to particular database constructs, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

According to one aspect of the invention, a constraint that restricts how a corresponding portion of a directory is stored in a database, is enforced on the corresponding set of data. In response to a query on any data from the portion of the directory, the effect of the constraint on how the data is stored is determined. The original query is rewritten, based on the effect of the constraint, so that the rewritten query is directed to a particular subset of the data stored in the database. Consequently, the search space is restricted to an identifiable subset of the database and, therefore, execution of the rewritten query is more efficient than execution of the original query. Furthermore, traditional optimization techniques, such as use of efficient access paths, can be applied to the rewritten query to further optimize the performance of the query.

For example, a folder from a file system directory is constrained to containing only data from files that conform to a particular XML schema, and all the data from files that conform to that particular schema is mapped to a particular database table. In response to receiving a query on data from files within the folder, the query is rewritten against the particular database table. Hence, the search can focus solely on the particular table rather than some larger set of the data stored in the database.

Operating Environment

The techniques described herein are described in the general context of a database system. A database system typically comprises one or more clients that are communicatively coupled to a server that is connected to a shared database. "Server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server. Among other functions of database management, a database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One database language supported by many database servers is known as the Structured Query Language (SQL).

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner. Further, similar features and technologies may be used within a relational database system to provide native support for storage, management, and query of any logically hierarchical set of data. For example, a relational database system may be augmented to support integration of a file system and corresponding directory structure within the database.

Figure 1B:
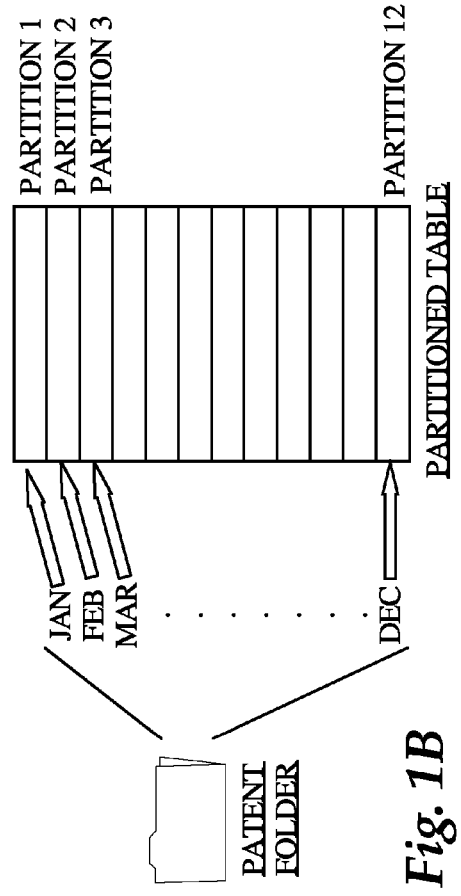

Constraining a Portion of a Directory to Restrict the Manner of Storage of Corresponding Data FIG. 1A and FIG. 1B are block diagrams that visually illustrate mapping portions of a directory structure to particular database constructs, according to an embodiment of the invention.

FIG. 1A illustrates a file system directory structure integrated within a database system via, in part, constraints on how data from certain portions of the directory are stored in certain database tables. In this example, (a) all 'po.xml' (XML data files for Purchase Orders) in the directory '/a/b' are constrained to storage in the 'po_tab' table;

(b) all '.bin' binary files in the directory '/a/b' are constrained to storage in the 'bin_tab' table;

(c) all '.txt' text files in the directory '/a/c' are constrained to storage in the 'txt_tab' table;

(d) all 'image.gif' graphics files in the directory '/a/c' are constrained to storage in the 'graphic_tab' table; and (e) all files of any kind in the directory 'a/c/d' are constrained to storage in the 'folder_d_tab' table.

Therefore, queries that target any such files in the directory can be optimized by transformation to queries that target the corresponding underlying table. Performance of the transformed query can focus on only the relevant table(s), i.e., an identifiable subset of the database.

FIG. 1B illustrates a folder ("patent folder") from a file system that is integrated within a database system via, in part, constraints on how data from the folder is stored in a partitioned table. How data from the folder is stored in a partitioned table is implemented by constraining certain portions of the data files in the folder to storage in certain database table partitions. In this example, pending patent applications are all stored as files in the 'patent folder' folder. The files in the patent folder are in some way identifiable by the month in which the patent was filed. Thus, the files in the patent folder can be mapped to certain table partitions based on which month the patent application was filed.

Therefore, queries that target any patent files in the patent folder can be optimized by transformation to queries that target the corresponding partition of the underlying table. Performance of the transformed query can focus on only the relevant table partition, i.e., an identifiable subset of the database. Furthermore, known query execution optimization techniques may also be applied to the partitioned table, such as partition pruning, etc.

The directory to table mappings illustrated in FIGS. 1A and 1B are non-limiting examples of how data that is logically organized in a hierarchical directory can be constrained with respect to how data from portions of the directory must be stored in the database, and are presented for purposes of examples only. Hence, embodiments of the invention are not limited to the particular types of constraints and mappings depicted in FIGS. 1A and 1B.

Optimizing Queries on Constrained Portions of a Hierarchical Directory

Figure 2:
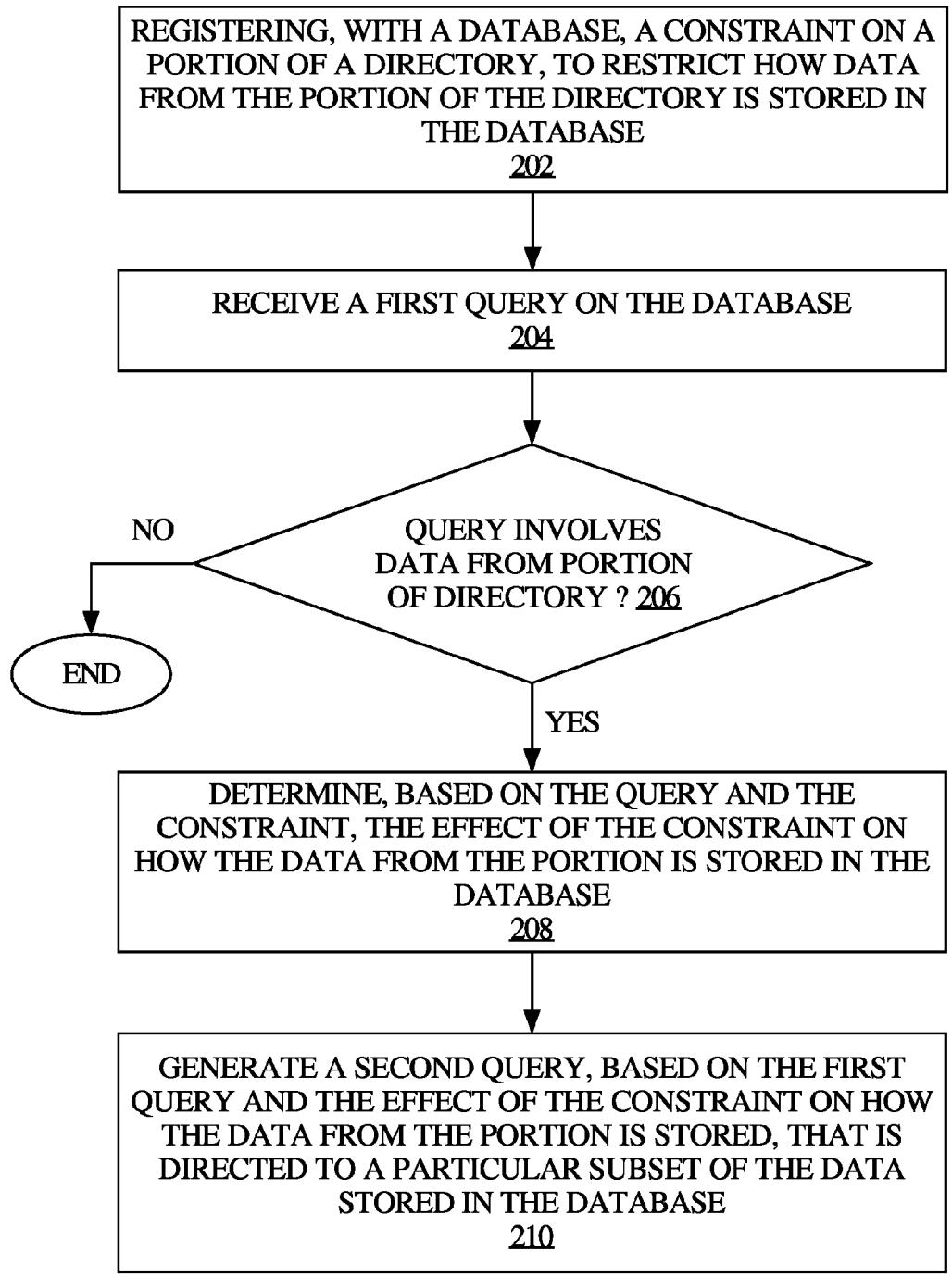
FIG. 2 is a flow diagram that illustrates a method for managing data, according to an embodiment of the invention.

FIG. 2 is a flow diagram that illustrates a method for managing data, according to an embodiment of the invention. More specifically, the technique illustrated in FIG. 2 can be used to optimize queries on data stored in a database in association with a hierarchical directory structure, such as data from files organized in a folder. The process illustrated in FIG. 2 is implemented for automated performance by a conventional computing system, such as computer system 300 of FIG. 3.

At block 202, a constraint on data from a portion of a directory is registered with a database system. The constraint restricts how data from a set of data associated with the portion of the directory is stored in the database. For example, in the context of storing data in a relational database in association with a file system directory, a constraint can be enforced upon a folder to restrict the type of files that can be created in that folder, and/or to restrict the set of one or more database tables in which data contained in the folder is stored. The term "folder" is used herein to generally refer to a portion of a file system directory represented in machine-readable form. Thus, a "folder" may refer to a single folder containing zero or more files at any given time, or may refer to multiple folders with each containing zero or more files at any given time.

According to one embodiment, a constraint can be enforced upon an identifiable grouping of files to restrict the set of one or more database tables in which data contained in the identifiable grouping of files is stored. For example, all XML documents that conform to a particular schema may be constrained to storage in a particular set of one or more database tables, whether or not the grouping of files are grouped via folder.

According to one embodiment, constraints are "registered" with the database system by creating and storing metadata for the portion of the directory. For example, metadata about the file system directory and directory structure is stored in the database, in association with the directory, as a separate file or as rows in one or more tables. The metadata mechanism can be used for both logical constraints and physical constraints.

However, the manner in which the effects of constraints are enforced in the database system, i.e., enforcing a mapping of certain data to certain table(s), view(s), or table partition(s), may vary from implementation to implementation. That is, logical and physical constraints may be enforced by the database system, by a mid-tier application, or by a combination of both.

Constraints

There are several types of constraints that can be created. Logical constraints may be created, such as the following. A "content constraint" restricts a portion of a directory to contain only files that have a certain type of content (e.g., Functional Specifications). A "metadata constraint" restricts a portion of a directory to contain only files that conform to a certain schema, e.g., an XMLSchema-based constraint for XML files. There are other logical constraints that can be specified as well, such as mime-type constraint, file=type constraint, etc. Such constraints can be used to optimize queries over the directory structure if all the files in a certain folder are stored in a specific database table or view or table partition.

In the context of a file system, logical constraints could be enforced by the file system itself. That is, it is the responsibility of the file system to guarantee that users are not able to incorrectly place a type of data into a constrained folder. Alternatively, logical constraints could be enforced by the user's application, with which the directory structure is integrated or by which the directory structure is generated. However, the manner in which the constraint is enforced by the file system may vary from implementation to implementation, and is beyond the scope of this description.

Physical constraints may be created, such as the following. A "table constraint" or a "partition constraint" maps the contents of a portion of a directory to a specific database table or partition, respectively. These types of constraints specify that files in a specified folder should be stored in a specific table or partition. For example, all files under the "Functional Specification" folder are restricted to storage into a functional_spec table. Physical constraints may be exclusive, meaning that the table or partition is exclusively used to store files only from that specified directory. Physical constraints may be inclusive, meaning that data from more than one folder may be mapped to the same table or partition. Physical constraints can be used with or without additional logical constraints, and logical constraints can be used with or without additional physical constraints.

A "size constraint" limits the size of the files that can be put in a specific folder. A size constraint can be used to restrict users from putting large files in a specific folder. The advantage of such a constraint is that, in the context of content management, the constraint enables better management of folders.

With constrained folders, queries involving such folders can be optimized in a better way. For example, using a physical constraint, all the files in a particular constrained folder can be mapped to a specific table. Thus, if any queries are received involving just that folder, the query can be rewritten to query the corresponding table. This will provide more efficient execution of the query because the search is restricted to a specific table, and various indexes on the table can be used to speed up the query.

Returning to FIG. 2, at block 204 a first query is received. For example, an SQL or XQuery query is received at a database server, with examples presented hereafter.

At decision block 206, it is determined that performing the first query would involve data from the constrained portion of the directory. For example, the query is analyzed to determine if any of the subjects of the query (i.e., database resources to which the query is directed, such as particular folders) are associated with corresponding metadata. If there is corresponding metadata available in the database, then the metadata is analyzed to determine whether any constraints on the corresponding subjects are included in the metadata. If there is a constraint on a subject of the query, then this means that performing the query does involve data from the constrained portion of the directory.

If at block 206, it is determined that the query does not involve data from the constrained portion of the directory, then the process terminates for this query. If at block 206, it is determined that the query does involve data from the constrained portion of the directory, then control passes to block 208.

At block 208, the effect that the constraint has on how data from the portion of the directory is stored, is determined. This effect is determined based on the first query and on the constraint that is registered with the database system at block 202. That is, the query is analyzed in view of the metadata that represents the constraint on the portion of the directory, and it is determined how the constraint affects the storage of particular data from the portion of the directory which is referred to in the query. For example, the query may refer to a particular folder (e.g., '/public/Design_Spec' folder), or set of folders, whose associated file data is constrained to storage in a particular table in the database (e.g., 'design_spec' table).

The effect that a given constraint may have on a query varies from situation to situation. A given constraint may subsume the entire query, where the given constraint affects all the subjects of the query, e.g., the query references only '/public/Design_Spec' and where all files in the 'public' folder are constrained to storage only in a particular table or tables. A given constraint may intersect with a portion of the query, where only a portion of the given constraint affects only a portion of the query, e.g., the query references '/public/Design_Spec' and '/private/Comments', where only the 'public' folder is constrained and not the 'private' folder. A given constraint may not affect any subjects referenced in the query, e.g., the query references only '/public/Design_Spec' and only the '/public/Functional_Spec' folder is constrained and the '/public/Design_Spec' folder is not constrained. A given constraint may be subsumed by the query, where the entire constraint affects only a portion of the subjects of the query, e.g., the query references '/public/Design_Spec' and '/public/Functional_Spec', where only the '/public/Design_Spec' folder is constrained and the '/public/Functional_Spec' folder is not constrained.

At block 210, a second query is generated based on the first query and based on the effect the constraint has on how the data from the portion of the directory is stored. The second query is directed to a particular subset of data stored in the database. That is, the second query is such that it acts upon only the particular tables, views, partitions, etc. in which the relevant data is stored based on the constraint. For a simple example, if the original query requests data from the '/public/Design_Spec' folder, and the '/public/Design_Spec' folder is constrained such that all files in that folder are stored in the database in the 'design_spec' table, then the original query is transformed to request data specifically from the 'design_spec' table.

Thus, the search space or query space is limited to a particular identifiable subset of the database and, therefore, the transformed query can be performed quicker and more efficiently than the original query. The manner in which the query is transformed to operate on the underlying relational or object-relational constructs, based on how the constraint enforces a specific storage scheme on the corresponding folder(s), may vary from implementation to implementation. One approach to transforming or rewriting the original query based on the effect of the constraint is, for a non-limiting example in the context of XML data, through use of techniques described in the Query Rewrite references.

Embodiments of the invention have been described in the context of managing data, and managing queries on the data, which is logically hierarchically-organized, such as data that is stored in a database in association with a file system directory. However, embodiments of the invention are not limited to such a context. For example, embodiments can be implemented in the context of an Internet search engine and associated repository for storing crawled web pages and indexes of content discovered in crawled web pages. Continuing with the example, assume that a user submits to a search engine an advanced keyword search that is restricted to a specific file type, and that all files of that type have been constrained to storage in a particular table or on a particular system server node, or the like. Thus, based on the user's keyword search, an actual query can be generated for submission to the search engine repository, where the query is directed to only the particular table or system node associated with the constraint, i.e., the query is directed to a reduced search space. In a variation of this example, keywords for files of the specific type may be constrained to storage in a particular keyword/web page index or identifiable set of indexes, whereby the query is directed to only the particular index(es) associated with the constraint.

Examples of transformed queries, based on the technique described in reference to FIG. 2, are described hereafter.

Exclusive Physical Table Constraints

With exclusive physical table constraints, the query on the folder can be completely translated to a query on the mapped table. For example, assume a physical constraint on a folder, i.e., the 'Design_Spec' folder, constraining storage of all files in that folder exclusively in a 'design_spec' table. Consider the following query on the folder:

```
select extract(res, '/Resource/Contents/*')
  from resource_view res
  where under_path(res, '/public/Design_Spec') = 1 and
  contains(extract(res, '/Resource/Contents'), 'David') > 1.
```

This query can be rewritten to the following query, which is directed solely to the table in which data in the 'Design_Spec' folder is stored.

```
select value(t) from design_spec t
  where contains(value(t), 'David') > 1.
```

Similarly, an XQuery query on the folder, such as

```
for $i in collection( )/public/Design_spec
  where $i/contents contains "David"
  return $i.
``` can be completely translated to a query on the mapped table. Note that the "contains" operation is for illustration purposes only, and that any operation on the resource data can be translated to the same or similar operations on the table. This example shows how XQuery functions, such as fn:collection( ), can be rewritten to an efficient query on the underlying storage tables, where multiple XML documents under a collection folder are mapped into multiple rows in a storage table designated for that particular collection folder.

Because the rewritten queries are now directed to the underlying relational database constructs, execution of such a query may utilize efficient access paths for evaluation of the underlying tables, which is performed in accordance with regular query optimization (e.g., by a traditional database query optimizer). Some techniques for rewriting XML queries directed to relational database constructs are described in the Query Rewrite references. The techniques disclosed in the Query Rewrite references may be used in conjunction with the embodiments described herein, but use of the Query Rewrite techniques with the embodiments described herein is not required.

Inclusive Physical Table Constraints

If the folder is constrained to a table with inclusive semantics, then the query cannot be translated to be directly on the table because there may be other rows in the table not related to this folder. In this case, the foregoing query can be rewritten to the following query, which is directed to a join of the table in which data in the 'Design_Spec' folder is stored and the resource on which the original query is directed, to eliminate rows that are not related to the 'Design_Spec' folder.

```
select extract(res, '/Resource/Contents/*') from resource_view res
  where under_path(res, '/public/Design_Spec') = 1 and
  exists(
    select null
    from design_spec t
    where contains(value(t), 'David') > 1) and
    ref(t) = extractvalue(res, '/Resource/XMLRef').
```

Logical Constraints

Consider a 'po' folder that is restricted to containing only XML documents belonging to an XMLSchema corresponding to purchase orders. There is a physical constraint on the entire hierarchy to map all XML documents corresponding to the purchase order XMLSchema to the 'po_tab' table. Thus, the following query:

```
select extract(res, '/Resource/Contents/*') from resource_view res
  where under_path(res, '/public/pofolder') = 1 and
  existsnode(res, '/Resource/Contents/PurchaseOrder[pono = 100]') = 1;
``` can be rewritten to the following query, which is directed to the 'po_tab' table in which data in the 'po' folder is stored:

```
select extract(res, '/Resource/Contents/*') from resource_view res
  where under_path(res, '/public/pofolder') = 1 and
  exists(select null from po_tab p where existsnode('/PurchaseOrder[pono = 100]') =1 and ref(p) = extractvalue(res, '/Resource/XMLRef') ).
```

Furthermore, if the 'po_tab' table contains purchase order XML documents only for the '/public/pofolder' folder (i.e., there is an exclusive physical table constraint to ensure 'po_tab' contains purchase order documents only from '/public/pofolder'), then the query can be further rewritten as follows:

select value(p) from po_tab p where existsnode('/PurchaseOrder[pono=100]')=1.

Logical constraints alone provide for some query optimizations. For example, if it is known that all 'purchaseorder' documents must reside in a specific folder, then queries on 'purchaseorder' can be rewritten to use only that folder. Additionally, if there are physical constraints on the folder, such as the folder is mapped to a specific table, that physical constraint can also be used to further optimize the queries, which is illustrated in the preceding example.

Furthermore, according to an embodiment of the invention, constraints involving other metadata attributes of a file or folder can be implemented, such as constraints relating to Author, CreationDate, LastModifiedDate, etc. For example, a metadata constraint that requires exclusive storing of files in a specific partition or table based on their CreationDate. Thus, based on such a constraint, any queries that involve the CreationDate can be rewritten to use only that specific partition or table.

Previous approaches to querying a hierarchical system stored in a relational database system require the user to figure out in which tables the particular data of interest is stored, and supply an explicit join of those various tables and the hierarchical system. Thus, such a query can be significantly complex. Furthermore, the user first needs to know that the particular folder stores only content corresponding to the particular table, etc. Such an approach does not allow the database system to use the constraint to optimize queries or update operations, as with the techniques described herein.

Hardware Overview

Figure 3:
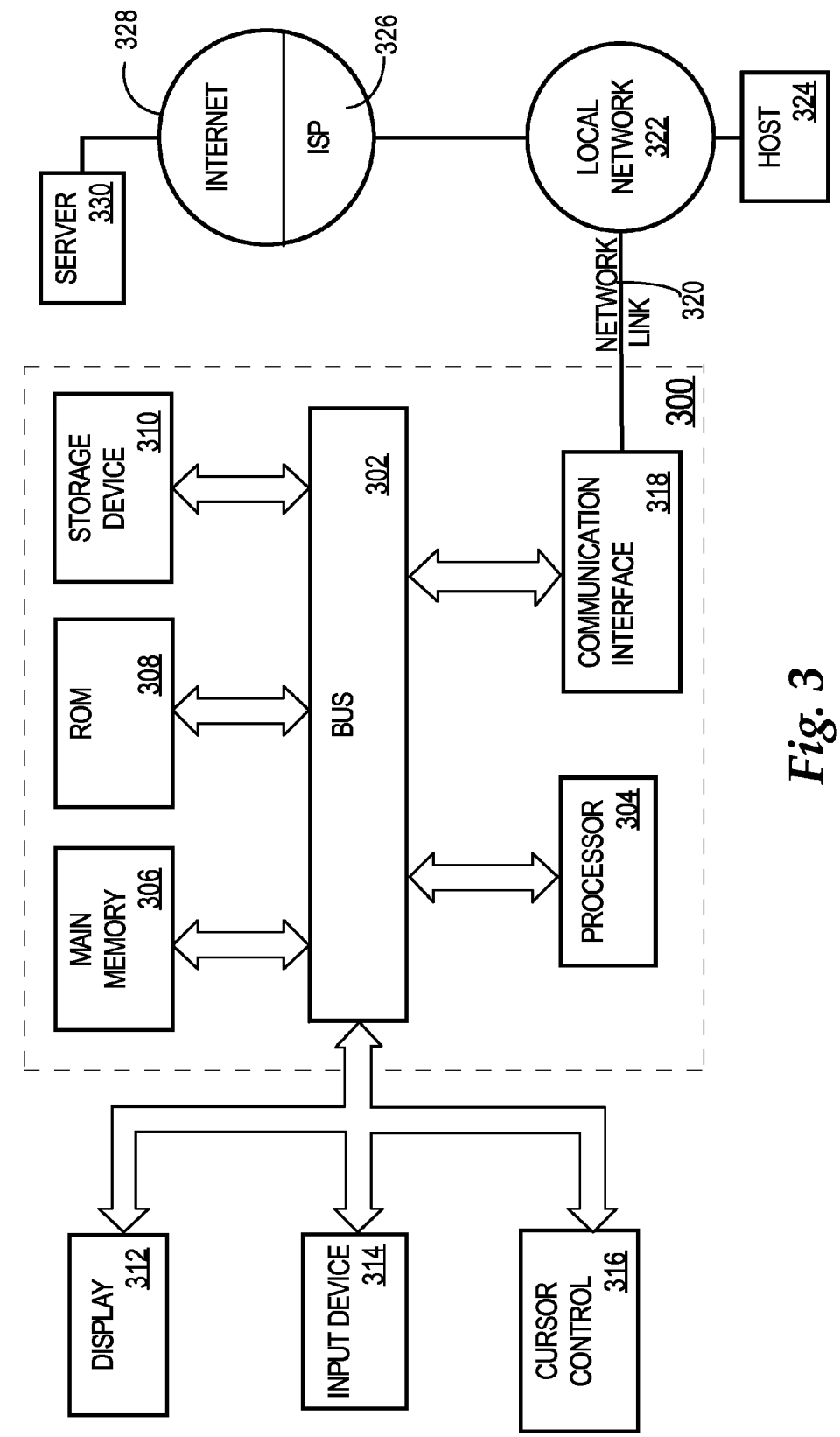
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim 1n any way. The specification and drawings are, accordingly, to be regarded in an illustrative rather than a restrictive sense.

What is claimed is:

1. A computer-implemented method comprising:
   storing, within database objects managed by a database system, data files contained in a directory of folders, each folder of said directory of folders containing at least one data file of said data files;
   in said database, storing metadata that defines plurality of constraints, wherein for each folder of said directory of folders, the plurality of constraints includes a physical constraint that specifies that storage of any data file in said each folder is restricted to at least one specified database object of said database objects;
   wherein for at least two of said directory of folders, a first folder includes a first data file that is restricted by a first physical constraint of said plurality of constraints to a first database object specified by said first physical constraint and a second folder includes a second data file that is restricted by a second physical constraint of said plurality of constraints to a second database object specified by said second physical constraint;
   wherein the first database object is different than the second database object; receiving, at the database system, a query that complies with a query language; in response to receiving said query:
      based on (1) said query and (2) the plurality of constraints defined by the metadata, said database system making a determination of how data required by the query is stored in said database; and
      based on the determination of how data required by the query is stored in said database, rewriting the query to generate a re-written query that specifies a restriction based on said first database object specified by said first physical constraint, wherein the received query did not specify said restriction.

2. The method of claim 1,
   wherein the plurality of constraints includes a logical constraint that restricts a particular set of one or more folders of said directory of folders to containing only files that contain a particular type of content;
   wherein receiving a query includes receiving a query that involves the particular type of content; and
   wherein re-writing the query includes re-writing the query so that the re-written query is directed, at least in part, to the particular set of one or more folders.

3. The method of claim 1,
   wherein the plurality of constraints includes a logical constraint that restricts a particular set of one or more folders of said directory of folders to containing only files that contain a particular type of content;
   wherein the plurality of constraints includes a physical constraint that restricts storing data from the files contained in the particular set of one or more folders to storage in a corresponding set of one or more particular database tables; and
   wherein receiving a query includes receiving a query that involves the particular set of one or more folders; and
   wherein re-writing the query includes re-writing the query so that the re-written query is directed, at least in part, to the corresponding set of one or more particular database tables.

4. The method of claim 1,
   wherein the plurality of constraints includes a logical constraint that restricts a particular set of one or more folders of said directory of folders to containing only files that contain a particular type of content;
   wherein the plurality of constraints includes a physical constraint that restricts storing data from the files contained in the particular set of one or more folders to storage in a corresponding set of one or more particular database tables; and
   wherein receiving a query includes receiving a query that involves the particular type of content; and
   wherein re-writing the query includes re-writing the query so that the re-written query is directed, at least in part, to the corresponding set of one or more particular database tables.

5. The method of claim 1,
   wherein the plurality of constraints includes a logical constraint that restricts a particular set of one or more folders of said directory of folders to containing only files that are associated with a particular XML schema;
   wherein receiving a query includes receiving a query that involves a file that is associated with the particular XML schema; and
   wherein re-writing the query includes re-writing the query so that the re-written query is directed, at least in part, to the particular set of one or more folders.

6. The method of claim 1,
   wherein the plurality of constraints includes a logical constraint that restricts a particular set of one or more folders of said directory of folders to containing only files that are associated with a particular XML schema;
   wherein the plurality of constraints includes a physical constraint that restricts storing data from the files contained in the particular set of one or more folders to storage in a corresponding set of one or more particular database tables;
   wherein receiving a query includes receiving a query that involves the particular set of one or more folders; and
   wherein re-writing the query includes re-writing the query so that the re-written query is directed, at least in part, to the corresponding set of one or more particular database tables.

7. The method of claim 1,
wherein the plurality of constraints includes a logical constraint that restricts a particular set of one or more folders of said directory of folders to containing only files that are associated with a particular XML schema;
wherein the plurality of constraints includes a physical constraint that restricts storing data from the files contained in the particular set of one or more folders to storage in a corresponding set of one or more particular database tables;
wherein receiving a query includes receiving a query that involves a file that is associated with the particular XML schema; and
wherein re-writing the query includes re-writing the query so that the re-written query is directed, at least in part, to the corresponding set of one or more particular database tables.

8. The method of claim 1,
wherein the plurality of constraints includes a physical constraint that restricts storing data from files contained in a particular portion of said directory of folders to storage in a corresponding set of one or more particular database tables;
wherein receiving a query includes receiving a query that involves the particular portion of said directory of folders; and
wherein re-writing the query includes re-writing the query so that the re-written query is directed, at least in part, to the corresponding set of one or more particular database tables.

9. The method of claim 1,
wherein the plurality of constraints includes a physical constraint that restricts storing data from files contained in a particular portion of said directory of folders to storage in a corresponding set of one or more particular database views;
wherein receiving a query includes receiving a query that involves the particular portion of said directory of folders; and
wherein re-writing the query includes re-writing the query so that the re-written query is directed, at least in part, to the corresponding set of one or more particular database views.

10. The method of claim 1,
wherein the plurality of constraints includes a physical constraint that restricts storing identifiable subsets of data from files contained in a particular portion of said directory of folders to storage in corresponding particular database table partitions;
wherein receiving a query includes receiving a query that involves the particular portion of said directory of folders; and
wherein re-writing the query includes re-writing the query so that the re-written query is directed, at least in part, to one or more corresponding particular database table partitions.

11. The method of claim 1,
wherein the plurality of constraints includes a logical constraint that restricts a particular set of one or more folders of said directory of folders to containing only files associated with particular metadata;
wherein receiving a query includes receiving a query that involves the particular metadata; and
wherein re-writing the query includes re-writing the query so that the re-written query is directed, at least in part, to the particular set of one or more folders.

12. The method of claim 1,
wherein the plurality of constraints includes a logical constraint that restricts a particular set of one or more folders of said directory of folders to containing only files associated with particular metadata;
wherein the plurality of constraints includes a physical constraint that restricts storing data from the files contained in the particular set of one or more folders to storage in a corresponding set of one or more particular database tables; and
wherein receiving a query includes receiving a query that involves the particular set of one or more folders; and
wherein re-writing the query includes re-writing the query so that the re-written query is directed, at least in part, to the corresponding set of one or more particular database tables.

13. The method of claim 1,
wherein the plurality of constraints includes a logical constraint that restricts a particular set of one or more folders of said directory of folders to containing only files associated with particular metadata;
wherein the plurality of constraints includes a physical constraint that restricts storing data from the files contained in the particular set of one or more folders to storage in a corresponding set of one or more particular database tables; and
wherein receiving a query includes receiving a query that involves the particular metadata; and
wherein re-writing the query includes re-writing the query so that the re-written query is directed, at least in part, to the corresponding set of one or more particular database tables.

14. A computer-implemented method comprising:
storing, within database objects managed by a database system, files contained in a plurality of identifiable groups of one or more files, each identifiable group of said plurality of identifiable groups of one or more files containing at least one file of said files;
in said database, storing metadata that defines a plurality of constraints, wherein for each identifiable group of one or more files of said plurality of identifiable groups, said plurality of constraints includes a physical constraint that specifies that storage of any file in said each identifiable group of one or more files is restricted to storage in a database in at least one specified database object from a group consisting of (a) a particular one or more database tables, (b) a particular one or more database table partitions, and (c) a particular one or more database views;
wherein for at least two of said groups of one or more files, a first group includes a first data file that is restricted by a first physical constraint of said plurality of constraints to a first database object specified by said first physical constraint and a second group includes a second data file that is restricted by a second physical constraint of said plurality of constraints to a second database object specified by said second physical constraint;
wherein the first database object is different than the second database object; receiving, at the database system, a query that complies with a query language; in response to receiving said query:
based on (1) said query and (2) the plurality of constraints defined by the metadata, said database system making a determination of how data required by the query is stored in said database; and
based on the determination on how data required by the query is stored in said database, rewriting the query to generate a re-written query that specifies a restriction based on said first database object specified by said first physical constraint, wherein the received query did not specify said group; and executing the re-written query that specifies a restriction based on said first database object.

15. The method of claim 14,
wherein said each identifiable group of one or more files is identifiable based on a particular set of one or more folders said each identifiable group of one or more files is associated.

16. The method of claim 14,
wherein said each identifiable group of one or more files is identifiable based on what particular XML schema said each identifiable group of one or more files is associated.

17. The method of claim 14,
wherein said each identifiable group of one or more files is identifiable based on a particular size range within which each of the one or more files falls.

18. The method of claim 14,
wherein said each identifiable group of one or more files is identifiable based on with what particular metadata attributes said each identifiable group of one or more files is associated.

19. A non-transitory computer-readable medium storing instructions, which, when executed by one or more processors, cause performance of:

storing, within database objects managed by a database system, data files contained in a directory of folders, each folder of said directory of folders containing at least one data file of said data files;

in said database, storing metadata that defines a plurality of constraints, wherein for each folder of said directory of folders, the plurality of constraints includes a physical constraint that specifies that storage of any data file in said each folder is restricted to at least one specified database object of said database objects;

wherein for at least two of said directory of folders, a first folder includes a first data file that is restricted by a first physical constraint of said plurality of constraints to a first database object specified by said first physical constraint and a second folder includes a second data file that is restricted by a second physical constraint of said plurality of constraints to a second database object specified by said second physical constraint;

wherein the first database object is different than the second database object;

receiving, at the database system, a query that complies with a query language;

in response to receiving said query:
based on (1) said query and (2) the plurality of constraints defined by the metadata, said database system making a determination of how data required by the query is stored in said database; and based on the determination of how data required by the query is stored in said database, rewriting the query to generate a re-written query that specifies a restriction based on said first database object specified by said first physical constraint, wherein the received query did not specify said restriction.

20. The non-transitory computer-readable medium of claim 19,
wherein the plurality of constraints includes a logical constraint that restricts a particular set of one or more folders of said directory of folders to containing only files that contain a particular type of content;

wherein receiving a query includes receiving a query that involves the particular type of content; and wherein re-writing the query includes re-writing the query so that the re-written query is directed, at least in part, to the particular set of one or more folders.

21. The non-transitory computer-readable medium of claim 19,
wherein the plurality of constraints includes a logical constraint that restricts a particular set of one or more folders of said directory of folders to containing only files that contain a particular type of content;

wherein the plurality of constraints includes a physical constraint that restricts storing data from the files contained in the particular set of one or more folders to storage in a corresponding set of one or more particular database tables; and wherein receiving a query includes receiving a query that involves the particular set of one or more folders; and wherein re-writing the query includes re-writing the query so that the re-written query is directed, at least in part, to the corresponding set of one or more particular database tables.

22. The non-transitory computer-readable medium of claim 19,
wherein the plurality of constraints includes a logical constraint that restricts a particular set of one or more folders of said directory of folders to containing only files that contain a particular type of content;

wherein the plurality of constraints includes a physical constraint that restricts storing data from the files contained in the particular set of one or more folders to storage in a corresponding set of one or more particular database tables; and wherein receiving a query includes receiving a query that involves the particular type of content; and wherein re-writing the query includes re-writing the query so that the re-written query is directed, at least in part, to the corresponding set of one or more particular database tables.

23. The non-transitory computer-readable medium of claim 19,
wherein the plurality of constraints includes a logical constraint that restricts a particular set of one or more folders of said directory of folders to containing only files that are associated with a particular XML schema;

wherein receiving a query includes receiving a query that involves a file that is associated with the particular XML schema; and wherein re-writing the query includes re-writing the query so that the re-written query is directed, at least in part, to the particular set of one or more folders.

24. The non-transitory computer-readable medium of claim 19,
wherein the plurality of constraints includes a logical constraint that restricts a particular set of one or more folders of said directory of folders to containing only files that are associated with a particular XML schema;

wherein the plurality of constraints includes a physical constraint that restricts storing data from the files contained in the particular set of one or more folders to storage in a corresponding set of one or more particular database tables;

wherein receiving a query includes receiving a query that involves the particular set of one or more folders; and wherein re-writing the query includes re-writing the query so that the re-written query is directed, at least in part, to the corresponding set of one or more particular database tables.

25. The non-transitory computer-readable medium of claim 19,
wherein the plurality of constraints includes a logical constraint that restricts a particular set of one or more folders of said directory of folders to containing only files that are associated with a particular XML schema;
wherein the plurality of constraints includes a physical constraint that restricts storing data from the files contained in the particular set of one or more folders to storage in a corresponding set of one or more particular database tables;
wherein receiving a query includes receiving a query that involves a file that is associated with the particular XML schema; and
wherein re-writing the query includes re-writing the query so that the re-written query is directed, at least in part, to the corresponding set of one or more particular database tables.

26. The non-transitory computer-readable medium of claim 19,
wherein the plurality of constraints includes a physical constraint that restricts storing data from files contained in a particular portion of said directory of folders to storage in a corresponding set of one or more particular database tables;
wherein receiving a query includes receiving a query that involves the particular portion of said directory of folders; and
wherein re-writing the query includes re-writing the query so that the re-written query is directed, at least in part, to the corresponding set of one or more particular database tables.

27. The non-transitory computer-readable medium of claim 19,
wherein the plurality of constraints includes a physical constraint that restricts storing data from files contained in a particular portion of said directory of folders to storage in a corresponding set of one or more particular database views;
wherein receiving a query includes receiving a query that involves the particular portion of said directory of folders; and
wherein re-writing the query includes re-writing the query so that the re-written query is directed, at least in part, to the corresponding set of one or more particular database views.

28. The non-transitory computer-readable medium of claim 19,
wherein the plurality of constraints includes a physical constraint that restricts storing identifiable subsets of data from files contained in a particular portion of said directory of folders to storage in corresponding particular database table partitions;
wherein receiving a query includes receiving a query that involves the particular portion of said directory of folders; and
wherein re-writing the query includes re-writing the query so that the re-written query is directed, at least in part, to one or more corresponding particular database table partitions.

29. The non-transitory computer-readable medium of claim 19,
wherein the plurality of constraints includes a logical constraint that restricts a particular set of one or more folders of said directory of folders to containing only files associated with particular metadata;
wherein receiving a query includes receiving a query that involves the particular metadata; and
wherein re-writing the query includes re-writing the query so that the re-written query is directed, at least in part, to the particular set of one or more folders.

30. The non-transitory computer-readable medium of claim 19,
wherein the plurality of constraints includes a logical constraint that restricts a particular set of one or more folders of said directory of folders to containing only files associated with particular metadata;
wherein the plurality of constraints includes a physical constraint that restricts storing data from the files contained in the particular set of one or more folders to storage in a corresponding set of one or more particular database tables; and
wherein receiving a query includes receiving a query that involves the particular set of one or more folders; and
wherein re-writing the query includes re-writing the query so that the re-written query is directed, at least in part, to the corresponding set of one or more particular database tables.

31. The non-transitory computer-readable medium of claim 19,
wherein the plurality of constraints includes a logical constraint that restricts a particular set of one or more folders of said directory folders to containing only files associated with particular metadata;
wherein the plurality of constraints includes a physical constraint that restricts storing data from the files contained in the particular set of one or more folders to storage in a corresponding set of one or more particular database tables; and
wherein receiving a query includes receiving a query that involves the particular metadata; and
wherein re-writing the query includes re-writing the query so that the re-written query is directed, at least in part, to the corresponding set of one or more particular database tables.

32. A non-transitory computer-readable medium storing instructions, which, when executed by one or more processors, cause performance of:
storing, within database objects managed by a database system, files contained in a plurality of identifiable groups of one or more files, each identifiable group of said plurality of identifiable groups of one or more files containing at least one file of said files;
in said database, storing metadata that defines a plurality of constraints, wherein for each identifiable group of one or more files of said plurality of identifiable groups, said plurality of constraints includes a physical constraint that specifies that storage of any file in said each identifiable group of one or more files is restricted to storage in a database in at least one specified database object from a group consisting of (a) a particular one or more database tables, (b) a particular one or more database table partitions, and (c) a particular one or more database views;
wherein for at least two of said groups of one or more files, a first group includes a first data file that is restricted by a first physical constraint of said plurality of constraints to a first database object specified by said first physical constraint and a second group includes a second data file that is restricted by a second physical constraint of said plurality of constraints to a second database object specified by said second physical constraint;

wherein the first database object is different than the second database object; receiving, at the database system, a query that complies with a query language; in response to receiving said query:

based on (1) said query and (2) the plurality of constraints defined by the metadata, said database system making a determination of how data required by the query is stored in said database; and based on the determination on how data required by the query is stored in said database, rewriting the query to generate a re-written query that specifies a restriction based on said first database object specified by said first physical constraint, wherein the received query did not specify said group; and executing the re-written query that specifies a restriction based on said first database object.

33. The non-transitory computer-readable medium of claim 32,
wherein said each identifiable group of one or more files is identifiable based on a particular set of one or more folders said each identifiable group of one or more files is associated.

34. The non-transitory computer-readable medium of claim 32,
wherein said each identifiable group of one or more files is identifiable based on what particular XML schema said each identifiable group of one or more files is associated.

35. The non-transitory computer-readable medium of claim 32,
wherein said each identifiable group of one or more files is identifiable based on a particular size range within which each of the one or more files falls.

36. The non-transitory computer-readable medium of claim 32,
wherein said each identifiable group of one or more files is identifiable based on with what particular metadata attributes said each identifiable group of one or more files is associated.

* * * * *

UNITED STATES PATENT AND TRADEMARK OFFICE
CERTIFICATE OF CORRECTION

PATENT NO. : 8,793,267 B2  
APPLICATION NO. : 13/454977  
DATED : July 29, 2014  
INVENTOR(S) : Krishnaprasad et al.

Page 1 of 1

It is certified that error appears in the above-identified patent and that said Letters Patent is hereby corrected as shown below:

On the Title Page

On page 2, column 1, Item (56) under Other Publications, line 1, delete "XQuey" and insert -- XQuery --, therefor.

On page 2, column 2, Item (56) under Other Publications, line 28, delete "Preli Minary" and insert -- Preliminary --, therefor.

In the Specification

In column 3, line 59, delete "'a/c/d'" and insert -- '/a/c/d' --, therefor.

In column 11, line 28, delete "1n" and insert -- in --, therefor.

In the Claims

In column 11, line 37, in Claim 1, after "defines" insert -- a --.

In column 18, line 33, in Claim 31, after "directory" insert -- of --.

Signed and Sealed this  
Third Day of March, 2015

Michelle K. Lee  
*Deputy Director of the United States Patent and Trademark Office*